(No Model.)
E. SELEN.
COMBINED SIDE DOOR AND SEAT FOR CARRIAGES.
No. 514,968. Patented Feb. 20, 1894.
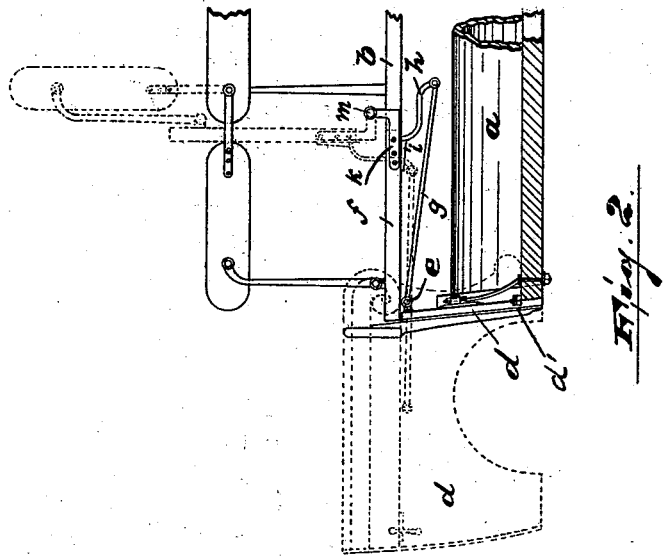
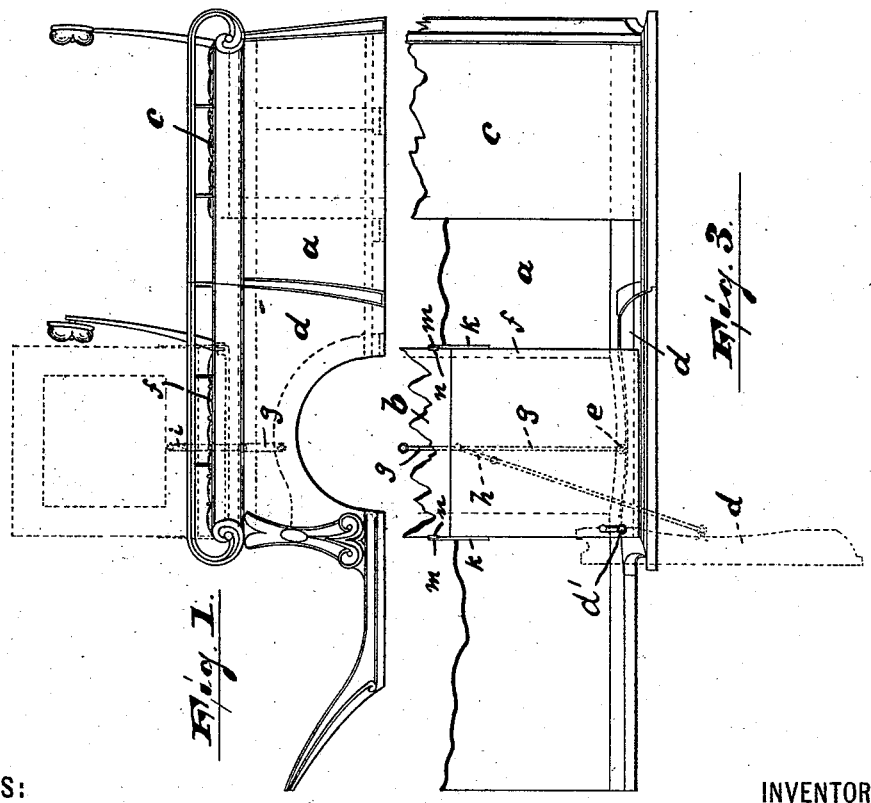
WITNESSES:
Wm. D. Nell.
Henry E. Cording.
INVENTOR:
Erik Selen
BY Gartner & Co
ATTORNEYS

UNITED STATES PATENT OFFICE.

ERIK SELEN, OF NEWARK, NEW JERSEY.

COMBINED SIDE DOOR AND SEAT FOR CARRIAGES.

SPECIFICATION forming part of Letters Patent No. 514,968, dated February 20, 1894.

Application filed November 17, 1893. Serial No. 491,212. (No model.)

*To all whom it may concern:*

Be it known that I, ERIK SELEN, a citizen of the United States, residing in Newark, county of Essex, and State of New Jersey, have invented certain new and useful Improvements in a Combined Side Door and Seat for Carriages; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to a new and useful improvement in a combined side door and movable seat for vehicles such as traps, &c.; and it consists in the construction and arrangement of parts whereby when the door of the vehicle is opened one of the seats preferably in front of the vehicle is automatically raised out of the way to permit access to the other seats, and it consists also in the combination and arrangement of the various parts hereinafter described and claimed.

The invention is illustrated by the accompanying drawings in which—

Figure 1 is a side elevation of a carriage containing my improvement; Fig. 2 an end elevation thereof and Fig. 3 a top plan view of the same.

In said drawings $a$ represents the body of a carriage, generally called "trap," $b$ one of the front seats thereof preferably fixed, and $c$ the rear seats. The door $d$ is hinged to the front of the body $a$ as at $d'$ (Figs. 2 and 3). Pivoted as at $e$ to about the center of the door $d$ is an arm $g$ which extends beneath the movable front seat $f$ and partially underneath the fixed front seat $b$. The end of this arm $g$ is pivotally secured to a brace or stay $h$. The end of this brace $h$ terminates in a plate $i$ which is secured firmly to the underneath surface of the movable seat $f$. The movable seat $f$ is provided at either side of the end contiguous to the fixed seat $b$, with a hinge plate $k$ which is pivoted as at $m$ to a corresponding upright $n$ on the fixed seat.

In operation, when the door $d$ is opened, the arm $g$ pivoted thereto is drawn out and through the brace $h$ throws the seat $f$ upward into a vertical position as indicated by dotted lines in Figs. 1 and 2. The seat $f$ turns on the pivots $m$ on the uprights $n$ of seat $b$. It is manifest that either one or both of the seats $b$ and $f$ can be operated by the door, or either side through the arm $g$ and brace $h$.

I do not intend to limit myself to the precise construction and detail of parts hereinabove described as various modifications thereof may be made without departing from the principles of my invention.

Having thus described my invention, what I claim as new, and desire to secure by Letters Patent, is—

1. The combination in a vehicle, of the door, a fixed seat, and a movable seat hinged to the inner side of said fixed seat, with a brace secured at one end underneath said movable seat, an arm pivoted to the other end of said brace and to the door, all arranged so that when said door is opened the movable seat is swung inward and upward on its hinges into a vertical position, substantially as shown and described.

2. The combination in a vehicle, of the door, a fixed seat, and a movable seat placed alongside of said fixed seat, with the plate $i$ secured to the under surface of said movable seat, a brace $h$ secured to said plate $i$, an arm $g$ pivoted to said brace $h$ and to the door, a hinge plate $k$ secured to the edge of the movable seat and an upright $n$ secured to said fixed seat and pivoted to said hinge plate, all arranged so that when said door is opened outward, the movable seat is turned on said upright inward and upward into a vertical position, substantially as shown and described.

In testimony that I claim the foregoing I have hereunto set my hand this 14th day of November, 1893.

ERIK SELEN.

Witnesses:
ALFRED GARTNER,
HENRY E. EVERDING.